Dec. 25, 1923.

M. FAESSEL 1,478,561

PISTON AND PISTON RING

Filed March 8, 1921

INVENTOR
Michael Faessel
BY ATTORNEY
Frank Warren

Patented Dec. 25, 1923.

1,478,561

UNITED STATES PATENT OFFICE.

MICHAEL FAESSEL, OF SEATTLE, WASHINGTON, ASSIGNOR, BY DIRECT AND MESNE ASSIGNMENTS, TO LOXON PISTON AND RING COMPANY, OF SEATTLE, WASHINGTON, A CORPORATION OF WASHINGTON.

PISTON AND PISTON RING.

Application filed March 2, 1921. Serial No. 448,961.

*To all whom it may concern:*

Be it known that I, MICHAEL FAESSEL, a citizen of the United States, residing at Seattle, in the county of King and State of Washington, have invented a certain new and useful Improvement in Pistons and Piston Rings, of which the following is a specification.

My invention relates to improvements in piston rings and to improvements in the pistons upon which such rings are used and the object of this improvement is to provide a simple and efficient ring that is constructed and arranged so that it will be pressed outwardly against the walls of a cylinder by fluid pressure exerted against the piston thereby effectively preventing the escape of any of the compressed fluid past the sides of the piston.

A further object is to provide a piston ring having a cylindrical throat portion that is adapted to be shrunk onto a piston and thus fixedly secured thereto and having a flaring mouth portion that is inclined away from the walls of the piston and that is adapted to expand and contract a sufficient amount to keep it always in snug contact with the walls of the cylinder.

A still further object is to provide a piston ring that is made up of two or more members that overlie each other and that are provided with cylindrical neck portions and flaring mouth portions the flaring mouth portions having slots to permit them to expand, the slots in the several members being offset with respect to each other.

With the above and other objects in view as will be apparent from the following description the invention consists in the novel construction, adaptation and combination of parts as will be more clearly hereinafter described and claimed.

Figure 1:
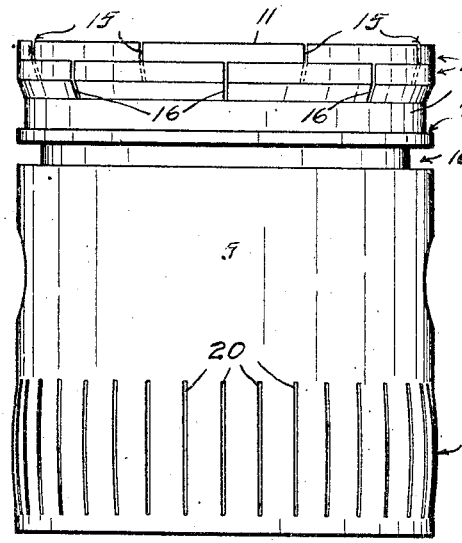
Figure 2:
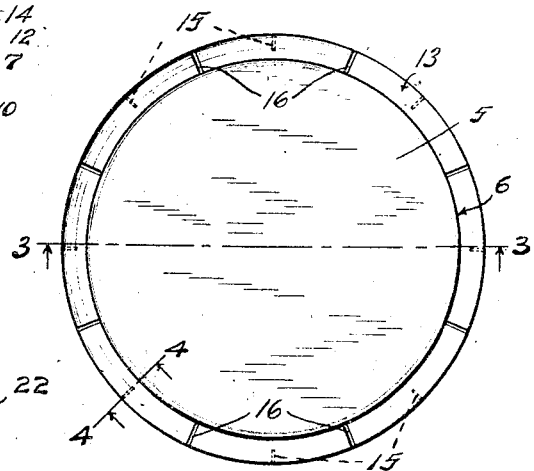
Figure 4:
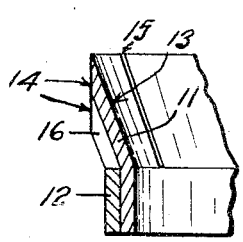
Figure 3:
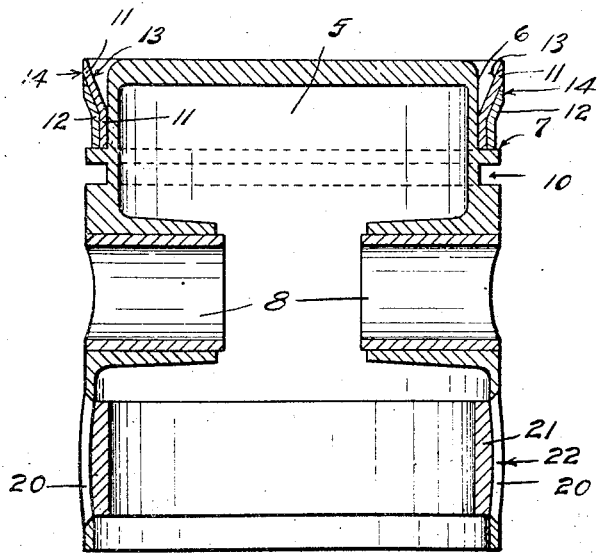

In the accompanying drawings Figure 1 is a view in side elevation of a piston having a piston ring constructed in accordance with my invention; Fig. 2 is a plan view showing the top of the piston and piston ring; Fig. 3 is a view in vertical section substantially on a broken line 3, 3 of Fig. 2, and Fig. 4 is an enlarged fragmentary sectional view substantially on broken line 4, 4 of Fig. 2.

Like reference numerals designate like parts throughout the several views.

Referring to the drawings the numeral 5 designates a piston having a cylindrical upper end 6 that is of smaller diameter than the lower portion of the piston and that terminates in a shoulder 7. The piston 5 is provided with the usual transversely arranged bearings 8 and if desired such piston may be provided just below the shoulder 7 with a ring groove 10 for the reception of a piston ring (not shown) of the usual form.

My piston ring comprises two interfitting members 11 and 12 each having a cylindrical base or throat portion and a flaring upper end or mouth portion, the member 12 being arranged to fit snugly over the outside of the member 11. The flaring upper end of the innermost member 11 presents an inclined or frustro-conical surface 13 against which any fluid as steam or gas that is compressed upon the top end of the cylinder may exert an outward or lateral pressure.

The outwardly flared portions of the members 11 and 12 terminate at their upper end in a cylindrical wall 14 that bears against the internal wall of the cylinder within which the piston is disposed and that forms a sharp edge at its intersection with the wall 13.

The flared portions of the members 11 and 12 are provided with a plurality of slots 15 and 16 respectively that extend from the upper extremities of the flared mouth portions downwardly to their junction with the cylindrical neck portions to thereby render the flared mouth portions more readily capable of expansion and contraction.

The abutting surfaces of the two ring members 11 and 12, the inner surface of the cylindrical neck portion of the innermost ring member 11 and the surface 14 that engages the wall of the cylinder are all preferably ground or machined so that they will fit accurately, while the external surface of the outer ring 12 and the inclined inner surface 13 of the inner ring 11 may be left rough.

The piston ring is permanently secured to the cylinder 5 by shrinking it upon the upper end 6 thereof in the position shown in Fig. 3 with the bottom of the ring resting on the shoulder 7.

The ring is constructed so that the diameter of the cylindrical wall 14 is slightly greater than the infernal diameter of the cylinder in which the piston is to be used so that when the piston is inserted in the cylinder the flaring portion of the ring will be compressed a slight amount and will spring outwardly into close contact with the walls of the cylinder. When compression of fluid occurs above the top end of the piston the lateral thrust due to such compression will press the flared portion of the ring tightly against the wall of the cylinder thereby preventing leakage of compressed fluid past the sides of the piston.

If desired a piston ring of the usual well known type may be placed in the annular ring groove 10 to prevent the passage of lubricating oil from the crank case upwardly around the sides of the piston.

If the piston 5 is constructed of aluminum, which has a high coefficient of expansion, then the lower portion of the piston is preferably provided with a plurality of spaced vertical slots 20 and an iron ring 21 is inserted within the slotted portion thereof, as shown in Fig. 3, so that when the piston is cold the slotted portion of the piston surrounding the iron ring will be bowed outwardly or expanded slightly as at 22 thereby preventing excessive clearance between the walls of the cylinder and thus preventing any possible wobbling motion and knocking of the piston. When the aluminum piston becomes hot it will expand a greater amount than the iron ring 21 and as it expands will tend to eliminate the bulged portion 23 and assume a true cylindrical shape.

If desired pistons of standard type may be reconstructed to adapt them for the reception of my piston ring by machining or turning the top ends of such pistons down to the desired smaller diameter.

This piston ring is simple in construction, easy to install, not expensive to manufacture and is especially efficient in its operation.

From the foregoing description taken in connection with the accompanying drawings the advantages of the construction and method of operation of this piston ring will be readily apparent, but while I have described the principle of operation of the invention together with the device which I now consider to be the best embodiment thereof it will be understood that the specific disclosure is merely illustrative and that such changes may be made as are within the scope and spirit of the invention.

What I claim is:

1. A piston having a cylindrical reduced end portion, a piston ring composed of two solid rings having cylindrical portions adapted to interfit in concentric relation, and flaring end portions adapted to engage the cylinder walls, said ring being shrunk on the reduced end of the piston for permanently securing it thereto.

2. A piston having a cylindrical reduced end portion, a piston ring including two solid rings having outwardly flared upper end portions and cylindrical portions interfitting in concentric relation, the inner ring being adapted to accurately fit the reduced end of the piston and be permanently secured thereto.

3. A piston having a cylindrical end of smaller diameter than the body thereof, and a piston ring having a flaring mouth portion and a cylindrical throat portion arranged to fit over the smaller end of said piston, the said flaring mouth portion being cut into a plurality of segments by slots that extend from the outer edge inwardly, and said throat portion accurately fitting and being permanently secured to the smaller end of said piston.

4. A piston having a cylindrical end of reduced diameter, and a piston ring having a cylindrical inner end arranged to fit over the smaller end of said piston and be permanently secured thereto and having a fustroconical outer end provided with an inner wall that flares outwardly from the sides of the piston and having near its outer extremity an external cylindrical wall arranged to engage with the inner walls of a cylinder.

5. A piston having a cylindrical end of smaller diameter than the body portion thereof, said end terminating in an abrupt shoulder, and a piston in of made up of a plurality of overlapping sections, each having a cylindrical throat portion, the end of which abuts said shoulder and a flaring mouth portion, said throat portions being arranged to fit over the smaller end of said piston and the mouth portion of each of said sections having its walls cut by slots that extend from the outer end thereof inwardly, the slots in adjacent sections being staggered with respect to each other, and said throat portions being permanently secured to each other and the smaller end of the piston.

6. A piston having a cylindrical reduced end portion, and a piston ring having a cylindrical throat portion fitting and permanently secured to the reduced end portion and lying within the circumference of the piston proper, and a flaring portion extending from one end of the throat portion beyond the circumference of the piston to engage the cylinder wall.

7. A piston having a cylindrical reduced end portion, and a piston ring including a plurality of solid rings having outwardly flared upper end portions and cylindrical portions interfitting in concentric relation, the inner ring being adapted to accurately fit the reduced end of the piston and be permanently secured thereto, and said flared end portions terminating in a cylindrical form so that the ends of all the rings will engage the cylinder wall.

In witness whereof, I hereunto subscribe my name this 24th day of February A. D. 1921.

MICHAEL FAESSEL.